US007044004B2

(12) United States Patent
Hurley et al.

(10) Patent No.: US 7,044,004 B2
(45) Date of Patent: May 16, 2006

(54) APPARATUS AND METHOD FOR APPLYING OPTICAL STRIPES FOR TORSIONAL DETECTION

(75) Inventors: Joseph David Hurley, Casselberry, FL (US); Peter Jon Clayton, Casselberry, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 215 days.

(21) Appl. No.: 10/804,394

(22) Filed: Mar. 19, 2004

(65) Prior Publication Data

US 2004/0192450 A1  Sep. 30, 2004

Related U.S. Application Data

(60) Provisional application No. 60/457,040, filed on Mar. 24, 2003.

(51) Int. Cl.
*G01L 3/12* (2006.01)
*G01L 3/02* (2006.01)
*G01L 3/10* (2006.01)
*G01L 3/14* (2006.01)

(52) U.S. Cl. .................................. 73/862.324
(58) Field of Classification Search ...................... None
See application file for complete search history.

(56) References Cited

U.S. PATENT DOCUMENTS 4,166,383 A * 9/1979 Lapeyre ................. 73/862.324
4,995,257 A  2/1991 Leon
5,001,937 A  3/1991 Bechtel et al.
5,253,531 A * 10/1993 Walker et al. ................. 73/650
5,438,882 A * 8/1995 Karim-Panahi et al. .......... 73/862.324
5,474,813 A * 12/1995 Walker et al. ............... 427/510
5,747,699 A * 5/1998 Ebi ............................. 73/800
6,901,815 B1* 6/2005 Torre ....................... 73/862.29
6,948,381 B1* 9/2005 Discenzo ............... 73/862.324

FOREIGN PATENT DOCUMENTS

GB  2 093 991 A  2/1982

* cited by examiner

*Primary Examiner*—Max Noori
*Assistant Examiner*—Octavia Davis

(57) ABSTRACT

The present invention provides a method and apparatus for applying a uniformly-distributed pattern of stripes (8) on a component (6) of a large rotary machinery, such as an industrial generator. A method is provided that comprises measuring the circumferential area of the component (6) with a measuring element (14). The precise circumference is indicated and a desired number of pattern segments is determined. The circumference is divided by this number to produce equally spaced segments. This is then transferred to the rotor shaft (6) by marking on the measuring element (12) the number of segments and making a copy of the markings onto a second strip (14). These strips are then aligned on the circumferential area and cross strips (22) are placed at each of the segment marks (16). The segment areas not covered by the cross strips (24) are then painted in a color that is optically distinguishable from the non-painted regions. An optical probe (2) is then able to scan the stripes to detect torsional forces in the rotor shaft.

19 Claims, 2 Drawing Sheets

APPARATUS AND METHOD FOR APPLYING OPTICAL STRIPES FOR TORSIONAL DETECTION

This invention claims priority to U.S. Provisional, No. 60/457,040, entitled "Improved Method of Applying Optical Stripes for Torsional Detection", filed Mar. 24, 2003, inventors Joseph David Hurley and Peter Jon Clayton.

FIELD OF THE INVENTION

The present invention relates to methods and apparatuses for applying an optical-stripe pattern, and more particularly to methods and apparatuses for applying an optical-stripe pattern that is uniformly distributed about the circumference of a rotating component of a large industrial machine in order to facilitate the detection of torsional vibration in the machine.

BACKGROUND

Rotating components of machinery, such as shafts, are continuously subject to torsional forces and resulting torsional vibrations. Though there is a wide variety of machinery that uses rotating shafts, power generators are particularly dependant on properly functioning rotor shafts. It is imperative that the torsional motion is measured accurately for variances and fluctuations that are indicative of improper tuning of torsional modes or excessive torsional forces. The sooner that such torsional vibrations are detected, the more reliably the mechanical operations can run, and the less damage the rotating components will cause to themselves and surrounding parts.

Torsional forces will create problems such as uneven rotation, which the optical probe 2 registers as a non-uniform reading of the pattern 8. The greater the sensitivity of the system, the sooner problems in the rotating components can be detected and remedied. As such, it is of paramount importance that the pattern be as uniform as possible. Even slight variances in the pattern can create large background readings that negate the higher levels of sensitivity of the entire system.

Usually when torsional forces are being measured, the normal operations of the related machinery need to be shut down. In the case of power generators, every hour of shutdown is a considerable loss in revenue and efficiency, sometimes totaling thousands of dollars per hour. Therefore it is important to minimize the length of time that a rotor is not operating. This is particularly important during forced outages, where there is a problem in the machinery that needs to be pinpointed and corrected quickly. However, it is also important to minimize the down time during scheduled outages, such as those for maintenance.

Different techniques have been developed for monitoring the torsional response of rotating components. One technique is for an optical probe to scan a circumferential area around a rotating shaft, as shown in FIG. 1. In this example, a fiber optic probe 2 is mounted to a stationary fixture 4 such as a bearing bracket, and optically scans a circumferential area on a rotating shaft 6. The area scanned needs to have some form of optically identifiable pattern 8, such as alternating bright and dark bands. The pattern is uniform around the circumferential area so that the optical probe reads a continuously repeating pattern as the shaft rotates. An example of such an approach is disclosed in U.K. Patent Application GB2093991A.

When utilizing optical torsional techniques like those described above, it is imperative that the optical pattern be evenly and precisely distributed about the circumference of the component being monitored. If the bright/dark bands are not evenly spaced and distributed, then there will be a variation in sensed frequency as the uneven bands rotate past the optical probe. These frequency variations will produce a signal which will appear to be similar to an actual torsional signal, but will instead be a false signal or noise as a result of the uneven spacing.

This is a particular challenge when patterns are retro-fitted onto rotating components after they are built and in use for a while. This creates problems in placing a uniform pattern onto a round surface and making sure that each pattern segment has the same width and spacing as all of the rest.

In order to create a uniform pattern, it is common practice in the art to provide a striped pattern strip, where the stripes have been created by computer or some other sort of accurate printing means, typically in the form of an adhesive tape or template for spray painting. Though this may provide for a uniform pattern along the length of the strip, it is unfortunately the case that despite best efforts, the ends of the strip almost never align properly. Therefore, where the ends of the strip join, the optical probe will read a non-uniform segment pattern. Depending on the error in joining the ends of the patterned strip, this can create a large background error that will effectively bury small variations in the torsional vibrations.

What is needed is a method for placing a uniform pattern onto a rotatable component such that all of the pattern segments are uniformly spaced. This needs to be done in a quick and accurate manner to minimize downtime while maintaining the pattern quality.

SUMMARY OF THE INVENTION

With the foregoing in mind, methods and apparatuses consistent with the present invention facilitate the creation of an evenly-spaced alternating light/dark pattern on the circumference of a rotating component of a large, rotary industrial machine, such as an industrial generator. Unlike conventional approaches, such as adhesive tapes or templates, improved methods and apparatuses consistent with the present invention make it possible to quickly and consistently create an optical pattern on a large rotary component, such that the pattern is evenly and precisely distributed about the circumference of the component. This even and precise distribution of the pattern is critical to the accurate detection of torsional vibration with optical techniques. First paragraph is sales pitch.

These and other objects, features, and advantages in accordance with the present invention are provided in one embodiment by a method of servicing generators by uniformly aligning optical stripes on a circumferential area of the rotor shaft. This method comprises measuring the circumferential area with a measuring element, where the measuring element flexibly laps the circumferential area. The precise circumference of the circumferential area is determined by indicating this on the measuring element, and then measuring the measuring element as necessary. Based in part on the size of the circumferential area, a desired number of pattern segments is determined and the circumference is divided into this number of equally spaced segments. This is accomplished by marking on the measuring element the number of equally spaced segments and making a copy of the markings onto a second strip. These strips are then aligned on the circumferential area and cross strips are placed at each of the equally spaced segment marks. Either after the cross strips are placed, or in conjunction with the placing, the segment areas not covered by the cross strips are then painted in a color that is optically distinguishable from the non-painted areas of the circumferential area. An optical probe is then able to scan the uniformly aligned optical stripes to detect torsional forces in the rotor shaft.

BRIEF DESCRIPTION OF THE FIGURES

The invention is explained in more detail by way of example with reference to the following drawings.

DETAILED DESCRIPTION OF THE INVENTION

The present invention comprises a method for properly aligning optically distinguishable stripes on a rotating component. The stripes are evenly spaced, such that they form a continuous band around a circumferential area on the rotating component. Unlike the pre-made tapes of the prior art, the present invention does not suffer from the inability to properly align the end of the tape; while maintaining the quality of the evenly spaced stripes that the pre-made tapes offer.

Figure 1:
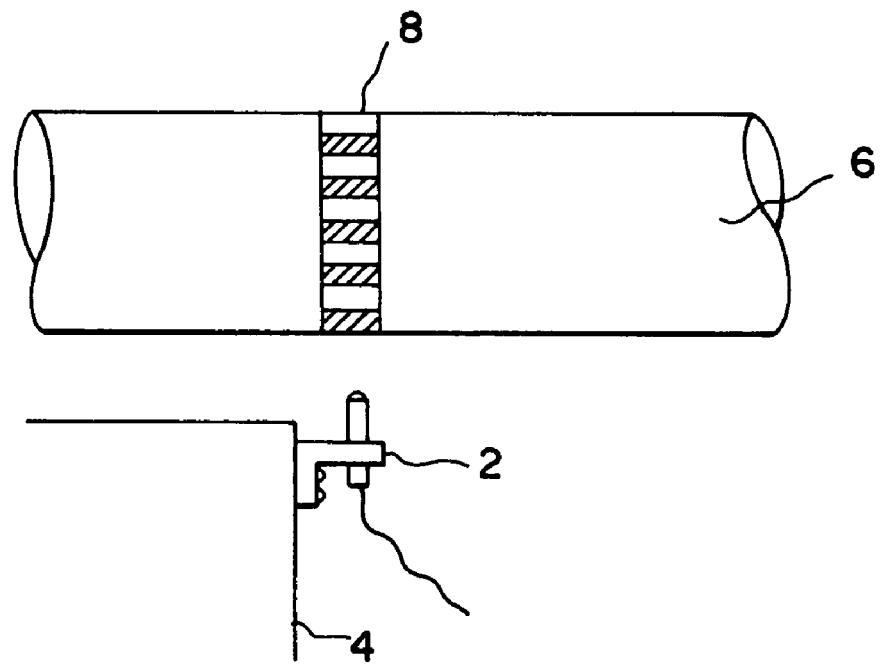
FIG. 1 illustrates an example of an optical probe measuring torsional forces by scanning a patterned circumferential area of a rotating shaft.

The invention may be used on any exposed area of a rotating component. An exemplary example of rotating components that benefit from this invention are rotating shafts, though the invention will be appropriate to use on other machinery as will be appreciated by one of ordinary skill in the art. The term exposed refers to any area of the rotating component that can be scanned by an optical probe, an example of which was shown in FIG. 1. Though the present invention may be used on machinery as it is manufactured, it is particularly advantageous when dealing with retro-fitting an optically distinguishable pattern onto existing machinery.

An optical probe 2 scans a pattern by measuring the optically 8 distinguishable bands. Bands appear much like zebra stripes. Though they do not have to be black and white, they do have to be optically distinguishable. This may be accomplished through color variation, or the other optical techniques, such as alternating reflective and non-reflective bands. As used herein, the term segment when referring to the optically distinguishable pattern refers to an optically distinguishable, or striped, portion and the adjacent "blank" portion.

The optical probe is fixed relative to the rotating component 4 and scans the area where the optically distinguishable pattern is/will be placed. As discussed, variations in the pattern lead to background noise, which effectively reduces the sensitivity of the system to detect torsional forces. The pattern creates noise when each stripe is not the proper width, and not evenly spaced with all of the other stripes.

Figure 2:
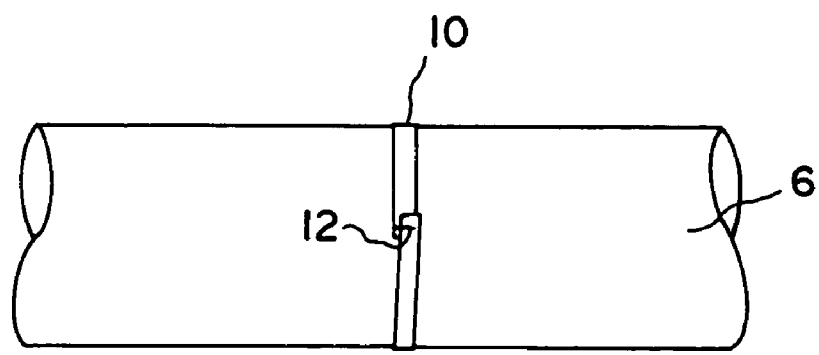
FIG. 2 illustrates an example of a measuring element being used to obtain an exact measurement of a shaft.
Figure 3:
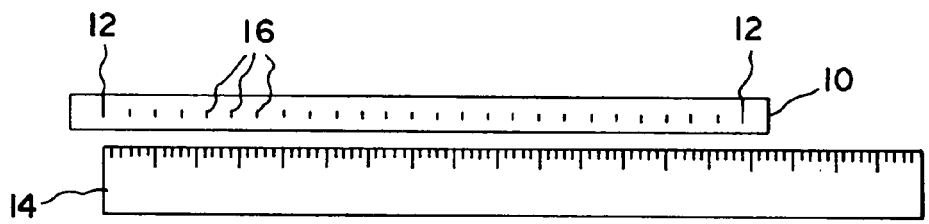
FIG. 3 illustrates one example of how a measuring element is divided into equal segments.
Figure 4:
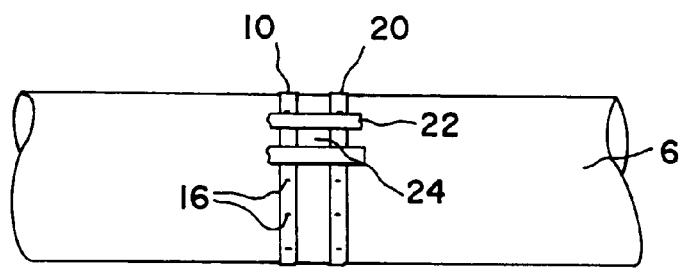
FIG. 4 illustrates one example of how the equally divided segments on the measuring element are transferred to a rotating component.

FIGS. 2–4 show one embodiment of how evenly spaced stripes in an optically distinguishable pattern are created on a circumferential area of a rotatable shaft. It may be desirable to clean, paint or polish the circumferential area at the onset depending on how the pattern is to be added to the rotatable component.

In FIG. 2, a measuring element 10 is tightly wrapped around the circumference of the shaft 6 in an exposed area. The measuring element 10 may be a variety of instruments, such as a tape, strip, string, band, etc., and may be a variety of materials, such as plastic, metal or paper. In one embodiment, the measuring element is a blank paper strip. In another embodiment it is a strip with standard measurements already in place.

The exact circumference of the shaft 6 at the given circumferential area is measured and indicated on the measuring element 10. In this example, the ends of the measuring element are off-set slightly so that a mark may be made simultaneously on the two ends 12. According to one embodiment of the present invention, the measuring element 10 is marginally elastic and smooth, such that when pulled it will uniformly stretch about the circumference of the shaft. Since the slight elasticity is uniform, when the measure element is removed and marked, the equally spaced segments remain equally spaced when the measuring element is once again wrapped around the shaft.

In a particular embodiment, the measuring element is paper tape, such as adding paper. This has the additional advantage of being easy to mark. Particular paper tapes include types manufactured by the PM Company™. Generally the elasticity can be from between 0.2–2%, but is more particularly 0.4–1.0%. This refers to the additional length the paper can be stretched without damaging the paper tape and without affecting the elasticity.

FIG. 3 illustrates one example of how a measuring element 10 is then divided into equally spaced segments. The circumference of the rotating component is precisely measured and divided by the number of desired segments:

$$L/N=i$$

where L is the circumference of the rotating component, N is the desired number of pattern segments, and i is the width of each of those pattern segments. The i intervals are then marked on one or more marking strips, one of which may be the measuring element as shown in FIG. 3. In one embodiment the marks for each interval are precisely determined by laying a graduated measuring tape or scale of sufficient length adjacent to the strip(s) to be marked. The length between intervals i=L/N can be precisely determined with a calculator. Starting at zero on the measuring tape or scale, marks on the strip(s) can then be made precisely at locations i, 2i, 3i, 4i, . . . , (N−1)i, and Ni.

The desired number of segments is dependant on a number of factors, such as the diameter of the rotating component and the resolution of the optical probe. Optical probes common in the field require the optically distinguishable stripes within a pattern segment to be between 0.5–3 cm in width, though this number may vary greatly depending on the type of optical probe used and the diameter of the rotating component. Typically, the present invention will use between 20 and 100 segments. The number of segments determines the carrier frequency in to the F-to-V converter, which is typically between 1000 and 6000 Hz. For example, 20 segments at a shaft speed of 3600 rpm (60 Hz) will provide a carrier frequency of 1200 Hz. 100 segments at a shaft speed of 3600 rpm (60 Hz) will provide a carrier frequency of 6000 Hz.

In the embodiment shown in FIG. 3, the circumference indicators 12 on the measuring element 10 are aligned with a ruler 14. Once the circumference is determined, it is divided by the desired number of segments, and these are then marked on the measuring element, which at this point becomes a marking strip.

At this point a second marking strip 14 can be created. It may be fashioned in the same manner that the first one is, or it may simply be copied from the first marking strip 10. Some embodiments of the invention may use two, three, four or even more marking strips in producing the patterned area.

FIG. 4 illustrates one embodiment where two marking strips 10, 20 are aligned circumferentially around a shaft 6. At the indicated segment markers 16 cross strips 22 are applied. The cross strips need to be narrower than the pattern segment to which they are applied so that there is left a uniform area 24 between the cross strips. In a particular embodiment the cross strips 22 are exactly half the width of the pattern segments.

If the cross strips 22 are adhesive, then they can be used as the optically distinguishable element within the segment. However, another embodiment is to, at this point, paint the uncovered areas 24 with a color or reflective material distinguishable from the background shaft material, and then remove the cross strips and marking strips, producing clean, uniformly spaced stripes in the circumferential area. The cross strips 22 may be made from similar materials as the marking strips, though not necessarily the same in any given application.

In FIG. 4, the stripes are parallel to the axis of the shaft 6. In one embodiment, however, the stripes 22 may be at an angle to the axis of the shaft. 45 degrees is a uniform angle that is easy to measure, however the stripes may be angled at any degree that is still optically scannable. In the embodiment shown in FIG. 4, it is indicated that the cross strips 22 are affixed to the shaft 6. In this manner the entire circumferential area can be prepped prior to painting. However, in another embodiment a template may be aligned with the segment markings, the desired area painted, and then the template moved to the next segment markings 16.

Figure 5:
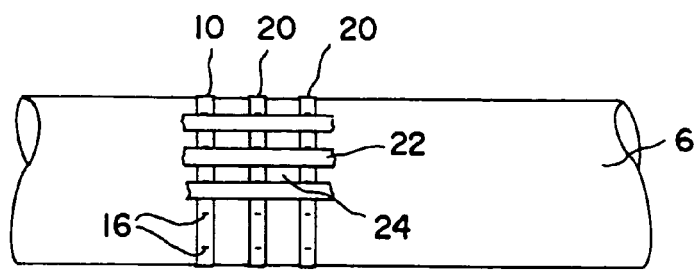
FIG. 5 illustrates the use of two patterned areas being created beside one another.

FIG. 5 illustrates the use of three marking strips 10, 20, all aligned with each other to produce two patterned areas. In similar embodiments, multiple patterned areas may be placed beside one another, in close proximity, or at disparate ends of a rotating component. They may be aligned with one another, as shown in FIG. 5, or they may be askew, or even at different angles from the axis.

Unlike the errors of the prior art, where an inability to properly join the ends of a patterned tape creates a large error spike, any error with the present invention spreads the error across many segments. This reduces the impact of the error and allows for greater sensitivity of the system. Further, the speed at which the present invention can be performed is better than that of most practices in the prior art. Even when a pre-printed patterned tape was used, the time and effort that went into attempting to properly align the tape and match the ends, cost the system in machinery downtime and loss of efficiency. Since the present invention can be performed quickly and accurately, the downtime, also known as outage, of the related machinery is minimized. Further, the present invention allows for semi-permanent to permanent stripes to be placed on a rotor shaft, unlike the less durable tapes of the prior art.

In one embodiment, the present invention provides for a method for servicing generators by uniformly aligning optical stripes on a circumferential area of a generator's rotor shaft. This method comprises measuring the circumferential area with a measuring element, where the measuring element flexibly laps the circumferential area. The precise circumference of the circumferential area is determined by indicating this on the measuring element, and then measuring the measuring element as necessary. Based in part on the size of the circumferential area, a desired number of pattern segments is determined and the circumference is divided into this number of equally spaced segments. This is accomplished by marking on at least one marking strip(s) the number of equally spaced segments and then aligning the marking strip on the circumference of the circumferential area. From the markings, a pattern of stripes on the circumferential area is created that corresponds to the number of equally spaced segments on the marking strip(s). An optical probe then scans the uniformly aligned optical stripes to detect torsional forces in the rotor shaft.

In one embodiment the marking strip(s) comprises two or more substantially identical marking strips. Aligning of the marking strip(s) comprises aligning the two substantially identical marking strips a predetermined distance apart, then applying a plurality of cross strips across the plurality of equally spaced segments, such that the border created by the two substantially identical marking strips and the banding strips defines the area in which the pattern of stripes are created. The marking strips may function as both a marking strip and a measuring element.

In another embodiment the stripes are produced by at least one of painting, polishing, etching and applying an adhesive material. The stripes may be at a uniform angle to the axis of the circumferential area, or at an angle, such as 45 degrees. As discussed, the number of segments is varied, but can typically be from 20–100. The patterned areas may be created in close proximity to each other, or spaced according to the optimal requirements of an optical probe.

In another embodiment the present invention provides for a method for servicing generators by uniformly aligning optical stripes on a circumferential area of a generator's rotor shaft. This method comprises measuring the circumferential area with a measuring element, where the measuring element flexibly laps the circumferential area. The precise circumference of the circumferential area is determined by indicating this on the measuring element, and then measuring the measuring element as necessary. Based in part on the size of the circumferential area, a desired number of pattern segments is determined and the circumference is divided into this number of equally spaced segments. This is accomplished by marking on the measuring element the number of equally spaced segments and making a copy of the markings onto a second strip. These strips are then aligned on the circumferential area and cross strips are placed at each of the equally spaced segment marks. Either after the cross strips are placed, or in conjunction with the placing, the segment areas not covered by the cross strips are then painted in a color that is optically distinguishable from the non-painted areas of the circumferential area. An optical probe then scans the uniformly aligned optical stripes to detect torsional forces in the rotor shaft.

In one embodiment the painting of the equally spaced banding patterns is performed after all of the cross strips are applied. In a particular embodiment the painting of the equally spaced banding patterns is performed after the placing of the cross strip and the cross strip is then placed on the next of the plurality of equally spaced segments. In still another embodiment the cross strips are half the width of the pattern segments.

In one embodiment of the present invention, a rotatable shaft is provided that has been retrofitted with multiple, uniformly aligned optical stripes on a circumferential area of the shaft. These are formed by measuring the circumferential area with a measuring element, where the measuring element flexibly laps the circumferential area. The measurement of the circumferential area is then indicated on the measuring element and the circumference is then determined there-from. The circumference is then divided into a number of equally spaced segments, and these are marked on the measuring element. A copy of the markings is also made on a second strip. These strips are then aligned on the circumferential area and cross strips are placed at each of the equally spaced segment marks. Either after the cross strips are placed, or in conjunction with the placing, the segment areas not covered by the cross strips are then painted in a color that is optically distinguishable from the non-painted areas of the circumferential area of the rotatable shaft.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for servicing generators by uniformly aligning optical stripes on a circumferential area of a generator's rotor shaft comprising:
   measuring said circumferential area with a measuring element, wherein said measuring element flexibly laps said circumferential area;
   indicating on said measuring element the measurement of said circumferential area;
   determining the circumference of said circumferential area from said measuring element;
   dividing the circumference into a plurality of equally spaced segments;
   marking on at least one marking strip said plurality of equally spaced segments;
   aligning said at least one marking strip on the circumference of said circumferential area;
   creating a pattern of stripes on said circumferential area corresponding to said plurality of equally spaced segments on said at least one marking strip; and
   scanning said un uniformly aligned optical stripes with an optical probe to detect torsional forces in said rotor shaft.

2. The method of claim 1, wherein said at least one marking strip comprises two substantially identical marking strips.

3. The method of claim 2, wherein said aligning of said at least one marking strip comprises aligning said two substantially identical marking strips a predetermined distance apart, then applying a plurality of cross strips across said plurality of equally spaced segments, such that the border created by said two substantially identical marking strips and said plurality of cross strips defines the area in which said pattern of stripes are created.

4. The method of claim 1, wherein said stripes are produced by at least one of painting, polishing, etching and applying an adhesive material.

5. The method of claim 1, wherein said measuring element also functions as one of said marking strips.

6. The method of claim 1, wherein said stripes are parallel to the axis of said circumferential area.

7. The method of claim 1, wherein said stripes are at a uniform angle to the axis of said circumferential area.

8. The method of claim 7, wherein said uniform angle is 45 degrees.

9. The method of claim 1, wherein the number of segments are from 20–100.

10. The method of claim 1, wherein diameter of the circumferential area is from 0.1 m to 5.0 m.

11. The method of claim 1, wherein multiple patterned areas are created in close proximity to each other.

12. The method of claim 1, wherein a plurality of said pattern of stripes are created at varied locations on said circumferential area.

13. A method for servicing generators by uniformly aligning optical stripes on a circumferential area of a generator's rotor shaft comprising:
   measuring said circumferential area with a measuring element, wherein said measuring element flexibly laps said circumferential area;
   indicating on said measuring element the measurement of said circumferential area;
   determining the circumference of said circumferential area from said measuring element;
   dividing the circumference into a plurality of equally spaced segments;
   marking on said measuring element said plurality of equally spaced segments;
   copying said plurality of equally spaced segments to a second strip;
   aligning said measuring element and said second strip on the circumference of said circumferential area;
   placing a cross strip at each of said plurality of equally spaced segments to create equally spaced banding patterns on said circumferential area;
   painting said equally spaced banding patterns in a color that is optically distinguishable from the non-painted areas of said circumferential area; and
   scanning said un uniformly aligned optical stripes with an optical probe to detect torsional forces in said rotor shaft.

14. The method of claim 13, wherein the painting of said equally spaced banding patterns is performed after all of said cross strips are applied.

15. The method of claim 13, wherein said measuring element is a paper tape.

16. The method of claim 13, wherein said cross strips are half the width of said pattern segments.

17. The method of claim 13, wherein the number of segments are from 20–100.

18. The method of claim 13, wherein the diameter of rotating component wherein diameter of the circumferential area is from 0.1 m to 5.0 m.

19. The method of claim 13, wherein a plurality of said pattern of stripes are created at varied locations on said circumferential area.

\* \* \* \* \*